United States Patent
Cooper

(10) Patent No.: US 7,469,570 B2
(45) Date of Patent: Dec. 30, 2008

(54) CALIBRATING SYSTEM FOR MEASURING SPRAYED MATERIALS

(75) Inventor: William R. Cooper, Johnstown, OH (US)

(73) Assignee: Owens Corning Intellectual Capital, LLC DE (US)

(*) Notice: Subject to any disclaimer, the term of this patent is extended or adjusted under 35 U.S.C. 154(b) by 374 days.

(21) Appl. No.: 11/401,580

(22) Filed: Apr. 11, 2006

(65) Prior Publication Data

US 2007/0235567 A1    Oct. 11, 2007

(51) Int. Cl.
*G01F 25/00*    (2006.01)

(52) U.S. Cl. .................. 73/1.73; 73/1.16; 73/1.26; 73/149; 239/74

(58) Field of Classification Search ........... 73/1.16, 73/1.73, 1.74, 149, 168, 1.26; 239/71, 74
See application file for complete search history.

(56) References Cited

U.S. PATENT DOCUMENTS

| | | | |
|---|---|---|---|
| 700,683 A | 5/1902 | Goetze | |
| 2,483,637 A | 10/1949 | Hawthorne et al. | |
| 2,509,861 A | 5/1950 | Cooper | |
| 2,756,591 A | 7/1956 | Hagerty et al. | |
| 3,033,026 A | 5/1962 | Krulish | |
| 3,081,623 A | 3/1963 | Domeisen | |
| 3,221,546 A | 12/1965 | Heath | |
| 3,459,049 A | 8/1969 | Kamps | |
| 3,478,580 A | 11/1969 | Siemietkowski et al. | |
| 3,680,371 A | 8/1972 | Marcio et al. | |
| 4,296,164 A * | 10/1981 | Bemis et al. ............ 428/219 |
| 4,409,845 A * | 10/1983 | Stufflebam et al. ........... 73/861 |
| 4,491,023 A * | 1/1985 | Graef ........................ 73/861 |
| 4,539,842 A | 9/1985 | McCollum et al. | |
| 4,693,122 A * | 9/1987 | Griffith ...................... 73/861 |
| 4,841,768 A * | 6/1989 | Kukesh et al. .............. 73/168 |
| 4,896,539 A * | 1/1990 | Salyani et al. .............. 73/861 |
| 4,932,232 A * | 6/1990 | Ballyns et al. .............. 72/201 |
| 5,000,043 A | 3/1991 | Bunch, Jr. et al. | |
| 5,319,988 A | 6/1994 | Claussen et al. | |
| 5,686,989 A | 11/1997 | Hoffman et al. | |
| 5,753,806 A * | 5/1998 | Ryan et al. ............... 73/114.46 |
| 6,085,585 A * | 7/2000 | Yu et al. ..................... 73/168 |
| 6,298,719 B1 | 10/2001 | Schoeffel et al. | |
| 6,508,112 B1 * | 1/2003 | Verhoeven ............... 73/114.46 |
| 6,645,392 B2 | 11/2003 | Frankenbach et al. | |
| 6,672,145 B2 | 1/2004 | Mitchell et al. | |
| 2004/0031776 A1 | 2/2004 | Gevelber et al. | |
| 2005/0215459 A1 | 9/2005 | Policicchio et al. | |

FOREIGN PATENT DOCUMENTS

| | | | |
|---|---|---|---|
| DE | 2648906 A | * | 5/1978 |
| JP | 11352021 A | * | 12/1999 |
| KR | 2003059962 A | * | 7/2003 |
| KR | 2005056627 A | * | 6/2005 |
| SU | 605112 A | * | 4/1978 |
| SU | 706133 A | * | 12/1979 |
| SU | 1041732 A | * | 9/1983 |

* cited by examiner

*Primary Examiner*—David A. Rogers
(74) *Attorney, Agent, or Firm*—James J. Dottavio; Jason S. Fokens

(57) ABSTRACT

A calibrating system for measuring amounts of sprayed material has an array of nozzles for dispensing a sprayed material and a capture apparatus positioned to receive the dispensed sprayed material from the array of nozzles. The capture apparatus has aligned channels configured for receiving the dispensed sprayed material.

15 Claims, 4 Drawing Sheets

CALIBRATING SYSTEM FOR MEASURING SPRAYED MATERIALS

TECHNICAL FIELD AND INDUSTRIAL APPLICABILITY

The present invention relates generally to a system for measuring a pattern of materials dispensed from a plurality of spray mechanisms. The present invention has industrial applicability in a glass fiber production system to substantially prevent an uneven spray of binder material from being dispensed onto forming glass fibers.

BACKGROUND OF THE INVENTION

Fiber products, particularly products made of glass fibers, are typically made as either continuous fibers or discontinuous fibers. Various materials can be applied to these fibers for protecting the fibers from abrasion, for connecting the fibers to each other to form a structural product, and for providing compatibility of the fibers with other materials, such as the compatibility between the reinforcement fiber and a plastic matrix. In the case of insulation products, the fibers are usually bonded together by organic material, such as a phenol/formaldehyde binder, to form a spring-like matrix which can recover after compression during packaging.

The application of the materials to the fibers can take several forms. Continuous fibers can be run through a bath or across a coater to apply a coating to the fibers, such as during the application of a size to continuous fibers. Alternatively, the material can be sprayed onto the fibers. This method is commonly used in the manufacture of insulation products with a rotary process where a cylindrical veil of fibers is met with the sprays of the phenol/formaldehyde binder.

One of the problems with applying aqueous organic binders to cylindrical veils of fibers is that it is difficult to achieve an even dispersion of the binder onto the fibers in the veil. In the past, the spray systems sometimes caused an overspray of material on the fibers, thus wasting spray material and sometimes affecting the quality of the formed fiberized material. In other instances, such spray systems caused an underspray of material onto the fibers, thereby producing a product with unevenly distributed coated fibers having less desirable properties.

SUMMARY OF THE INVENTION

In accordance with one aspect of the present invention, a calibrating system for measuring amounts of sprayed material includes an array of nozzles for dispensing the sprayed material. A capture apparatus is positioned to receive the dispensed sprayed material from the array of nozzles. The capture apparatus has aligned channels for receiving the dispensed sprayed material.

In certain embodiments, the capture apparatus comprises a curved wall containing the aligned channels. The channels have: an upper section which receives a first amount of the sprayed material; a mid section mounted below the upper section which receives the first amount of the sprayed material from the upper section and further receives an additional amount of the sprayed material; and, a lower section mounted below the mid section which collects the sprayed material from the mid section.

In certain embodiments, the mid sections of the channels are configured for receiving outlier drops of the dispensed sprayed material so that substantially all the dispensed sprayed material is collected and measured in the lower section.

In certain embodiments, at least one nozzle in the array is moveable in an independent direction with respect to at least one of the other nozzles and/or to the capture apparatus. The nozzles can have pivot members to allow the nozzle to be independently adjusted with respect to at least one of the other nozzles, or to the capture apparatus.

In another aspect, the present invention relates to a method of calibrating multiple spray patterns of a sprayed material being dispensed from multiple nozzles. The method includes spraying a material onto a capture apparatus; collecting the dispensed sprayed material in the capture apparatus, where the capture apparatus has a plurality of aligned collection channels for receiving the sprayed material; and, iii) measuring the collected material.

In one particular aspect, considerable improvement is realized in the glass filament production by the balancing, or calibrating, of the pattern of materials being sprayed onto the glass filaments. The calibrating system measures the amounts of sprayed material from an array of nozzles as the sprayed material falls into its dispensed pattern. The calibrating system allows the user to individually adjust, or balance, the spray nozzle in order to achieve the desired pattern. The calibrating system substantially prevents any uneven distribution of materials onto the forming glass fibers.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

DETAILED DESCRIPTION AND PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. It is to be noted that like numbers found throughout the figures refer to like elements.

In one aspect, the present invention is useful for measuring the quantity of materials being distributed from a plurality of orifices, or nozzles. In certain embodiments, the present invention is especially useful in measuring the amounts of material being dispensed onto a three-dimensional object.

This invention will be described using glass fibers as an example of the three-dimensional object. It is to be understood that the invention can be practiced with other objects. Also, although the invention will be described using a liquid coating material dispensed onto the glass fibers, it is to be understood that other dispensed materials can be used with the invention.

The present invention provides a calibrating system for measuring the efficiency of a multiple spray apparatus. The calibrating system allows the user to change several variables that can affect the efficiency of the multiple spray apparatus. These variables can be changed either simultaneously or individually so that the dynamics of the individual nozzles and the interrelationships between the multiple spray patterns being dispensed are readily measured, and adjusted, if necessary.

Figure 1:
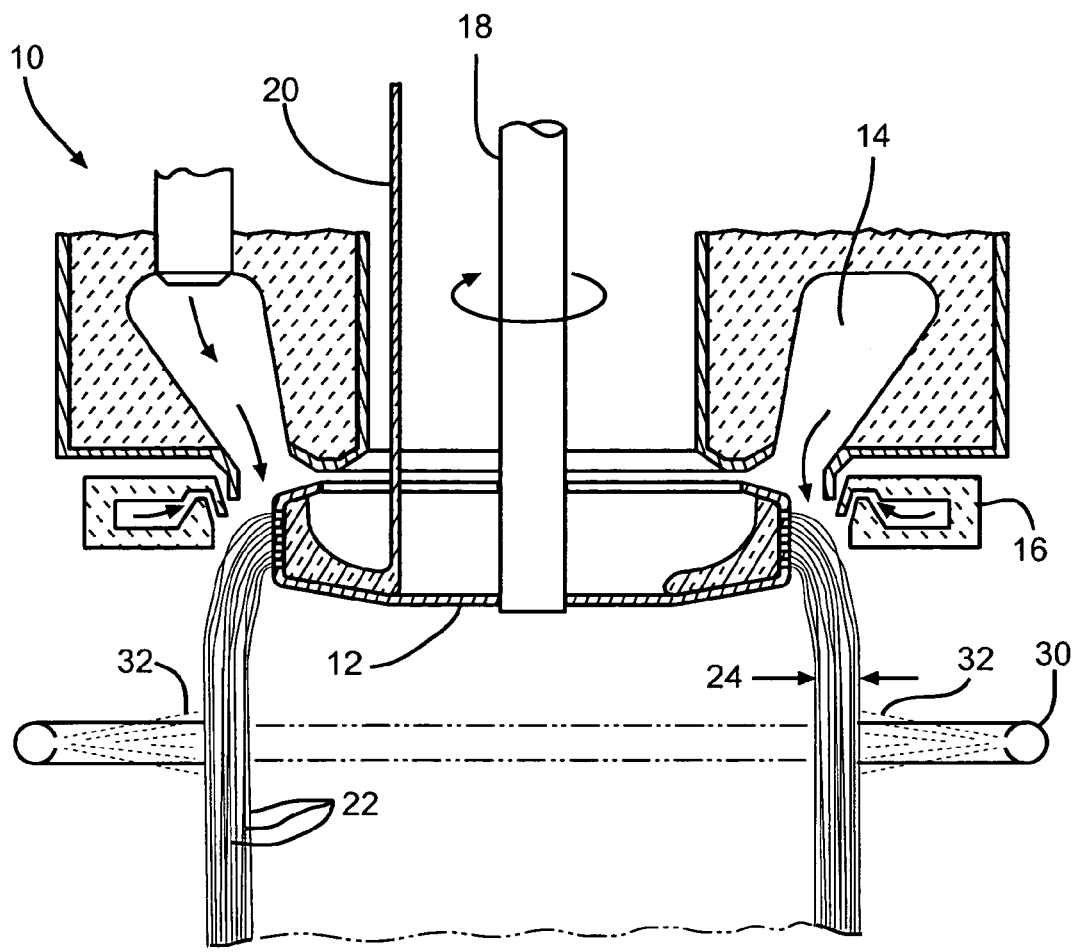
FIG. 1 is a schematic cross-sectional illustration of an apparatus for coating glass fibers with a sprayed material.

Referring now to FIG. 1, a fiberizing apparatus 10 includes a spinner 12, an annular burner 14 and an annular blower 16. The spinner 12 is rotated on an axle or quill 18. A stream 20 of molten glass is delivered from a glass melting furnace, not shown, and the molten stream 20 drops into the interior of the rotating spinner 12. The centrifugal forces of the rotating spinner 12 force the molten glass 20 to emanate from the spinner 12 in the form of fine glass streams that are turned downwardly as glass fibers 22 by the action of the blower 16 and gases induced by the blower 16. The blower gases and induced air attenuate the glass fibers 22 into their final fine diameter, typically within the range of from about 3 to about 8 microns. The burner 14 is typically gas fired and supplies heat to the spinner 12 and the fiber forming environment.

The glass fibers 22 travel in a downwardly moving veil, or target, 24, which is generally cylindrical in shape, and which contains not only the glass fibers 22, but also rapidly moving air and gases of combustion from the burner 14. The target 24 initially has a diameter slightly larger than the diameter of the spinner 12. The size or diameter of the target 24, and the rotational speed of the gases and fibers within the target 24, change as the target 24 moves downwardly. These changes are due to dissipation of the original energy of the gases within the target 24, and on external forces influencing the target 24.

One or more nozzles 30 are positioned to direct liquid spray materials 32 onto the target 24. Such spray materials 32 could include water or other evaporative liquids to cool the fibers and associated gases within the target. The nozzles 30 could also spray a lubricant onto the fibers to reduce fiber-to-fiber friction in the ultimate insulation product, which could thereby prevent fiber damage. The nozzles 30 could also be used to add a resinous binder to the glass fibers. Resinous binders, such as urea phenol formaldehyde, are well known in the art. The nozzles 30 are supplied with the desired liquid by means not shown.

Figure 2:
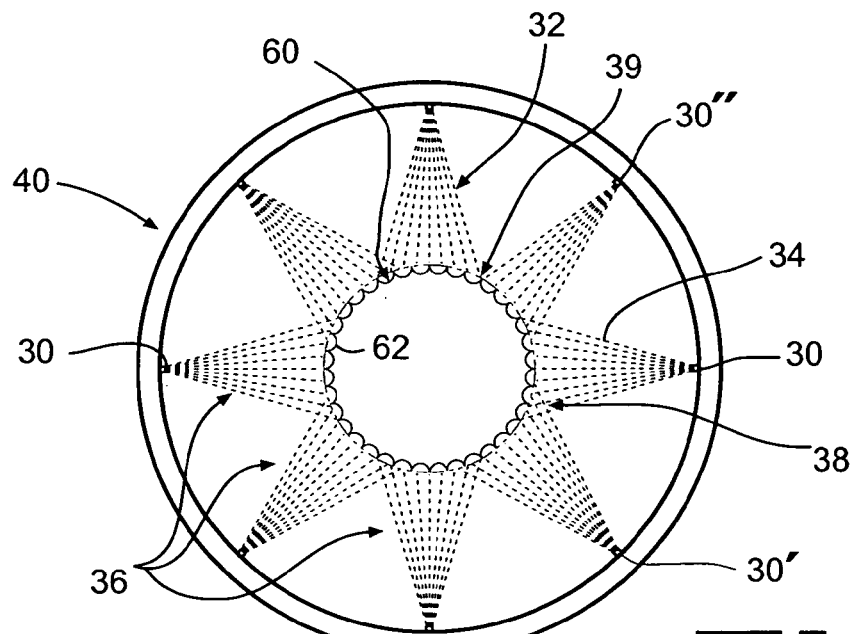
FIG. 2 is a plan view showing patterns of spray being dispensed from an array of nozzles.

FIG. 2 is a schematic illustration showing of an array, or plurality, 40 of nozzles 30. The nozzle 30 distributes a spray pattern 34, depending on various factors, including, for example, the type of material being sprayed, the size of the nozzle orifice, the coincidence angle onto the target, the shape and type of the spray (ex. flat, round, full cone, hollow cone, atomized, etc.), and the distance of the nozzle from the target.

When multiple nozzles 30 are used to spray material onto the target 24, the resulting overall spray pattern 36 of material is greatly complicated by overlapping sprayed materials from the neighboring nozzles. For instance, as schematically illustrated in FIG. 2, the nozzle 30 and its adjacent nozzle 30' can form an overlapping area 38 of the dispensed material 32. This overlapping area 38 would then be deposited as an overspray. In another instance, also illustrated in FIG. 2, another nozzle 30" can form an untapped area 39, which then causes an underspray.

Figure 3:
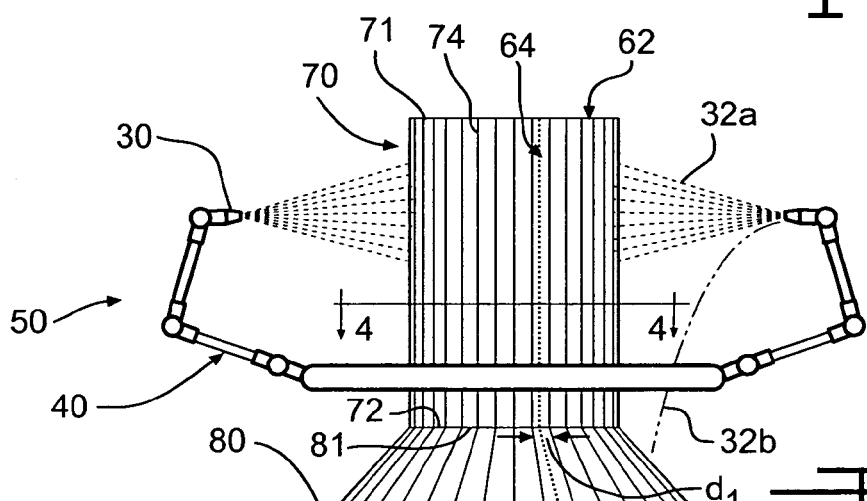
FIG. 3 is a schematic elevational illustration, partially broken away, of a calibrating system.
Figure 3:
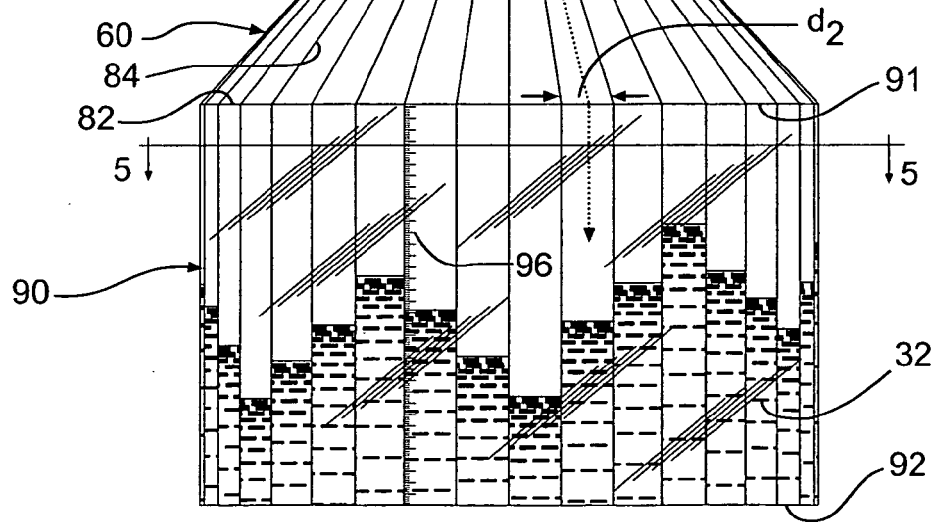

FIG. 3 schematically illustrates a calibrating system 50 which takes into consideration the operating parameters of the individual nozzles and also takes into consideration the interrelationship of multiple nozzles. The calibrating system 50 allows for the adjustment the nozzles 30 in order to distribute a desired overall spray pattern of the dispensed material 32. For ease of illustration, only two opposing nozzles are shown in FIG. 3; it should be understood, however, that the nozzle array 40 can have any desired number of nozzles in order to dispense a desired even pattern of material.

The calibrating system 50 allows for the determination of such additional variables as, for example, the optimum number of nozzles to be used, the spacing between the nozzles, and the intersection of colliding adjacent sprays due to the coincidence angle of the nozzles.

The calibrating system 50 includes the array 40 of nozzles 30 and a capture apparatus 60 positioned to receive the dispensed material 32 from the nozzle array 40. The nozzles 30 are configured to dispense a desired quantity of the dispensed material 32 onto the capture apparatus 60. One or more of the nozzles 30 is configured to move in an independent direction with respect to the other nozzles and to the capture apparatus 60, as further explained below.

Figure 4:
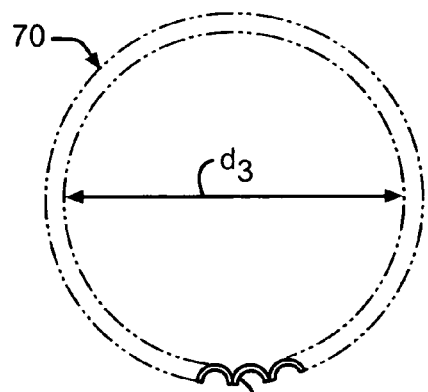
FIG. 4 is a cross-sectional view taken along the line 4-4 in FIG. 3.
Figure 7:
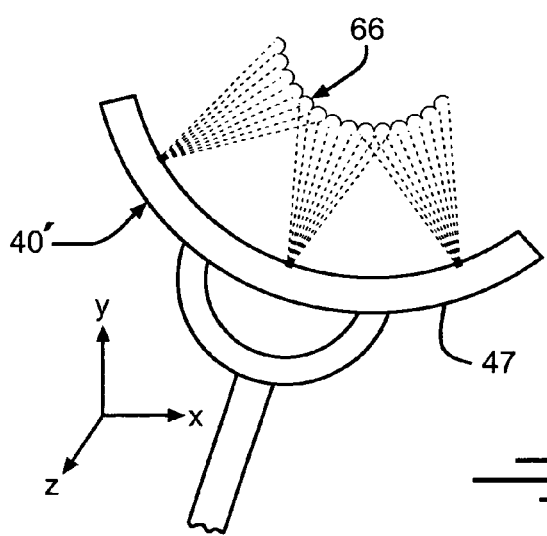
FIG. 7 is a partial, schematic plan illustration showing another embodiment of a capture apparatus and a multi-nozzle array.

The capture apparatus 60 includes a wall 62 of aligned channels 64 configured for receiving the dispensed material 32. In the embodiment shown in FIG. 3, the wall 62 comprises plurality of parallel aligned channels 64 which extend substantially from a top to a bottom of the capture apparatus 60. When the calibrating system is being used to assess the accuracy of a spray system (such as the glass fiber forming process illustrated in FIG. 1), the wall 62 can have the same dimensions as the target 24; that is, the wall 62 can mimic the shape of the target upon which the sprayed material will be dispensed. For example, as shown in FIG. 4, the wall 62 can have a substantially annular, or cylindrical, shape of the aligned channels 64. In other embodiments, for example, as shown in FIG. 7, the wall 62 can mimic a portion of a target; i.e., the wall 62 can be a curved quarter-round wall 66 (or a curved third-round), of the circular shaped wall 62 of the aligned channels 64 can be used, as further described below.

The channel 64 is configured to receive a separate amount of the dispensed material 32 so that the separate amount is independently collected by the channel 64. In certain embodiments, the channel 64 is formed integrally with the wall 62 of the capture apparatus 60.

The channel 64 has an upper section 70, a mid section 80 and a lower section 90. The upper and mid sections 70, 80 at least temporarily receive the sprayed material 32, while the lower section 90 collects, or retains, the sprayed material 32 for measurement, as further explained below.

The upper section 70 is configured to receive at least a first amount 32a of the dispensed material 32. In certain embodiments, the first amount 32a is generally the "main", or primary amount, as determined by the shape of the coincidence angle of the nozzles. The upper section has a first end 71, which defines the top of the wall 62, and a second, opposing end 72.

Each upper section 70 has sides 74 which extend radially outwardly from the wall 62, as shown in FIG. 4. The sides 74 provide the upper section 70 with an open shape for receiving and collecting the first amount 32a of the dispensed material. The sides 74 can have any suitable shape, such as, but not limited to semi-circular, square, rectangular, or "V" shape. The first amount 32a is received within the upper section 70 and gravitational forces allows the first amount 32a to flow from the second end 72 into the mid section 80.

The mid section 80 is mounted below the upper section 70 and defines a center of the wall 62. The mid section 80 has a first end 81 and a second, opposing end 82. Each mid section 80 has sides 84 which extend radially outwardly from the wall 62. The sides 84 provide the mid section 80 with an open shape for receiving a second amount 32b of the dispensed material 32. The sides 84 can have any suitable shape, such as, but not limited to semi-circular, square, rectangular, or "V" shape. In certain embodiments, the second amount 32b of the dispensed material 32 is generally the "mist", or outlier, drops which deviate from the first dispensed amount 32a.

The mid section 80 is also configured to receive the first dispensed amount 32a from the upper section 70. In the embodiment shown in FIG. 3, the midsection 80 extends at a downward angle away from the upper section 70. Also, the mid section 80 of each channel 64 has a flanged shape where the top end 81 thereof has a first internal diameter, d1, and the bottom end 82 has a second, and greater, internal diameter, d2.

The first amount 32a and the second amount 32b are temporarily received in the mid section 80 and gravitational forces allow the first and second amounts 32a, 32b to flow from the second end 82 into the lower section 90. Thus, the upper section 70 and the midsection 80 comprise a continuously extending open channel which is connected to the lower section 90.

The lower section 90 is mounted below the mid section 80 and defines a bottom of the wall 62. The lower section has an open first end 91 and a closed second, opposing end 92. Each lower section 90 also has an enclosed sidewall 94 (best seen in FIG. 5) which terminates at the closed second end 92.

The lower section 90 is configured to collect the dispensed amounts 32a and 32b from the mid section 80. The dispensed amounts 32a and 32b flow into the lower section 90 due to gravitational forces. The sidewall 94 of the lower section 90 can have any desired shape, such as a cylindrical or flask shape. It is desired that the sidewall 94 include graduated marks 96 so that the amount, or volume, of the dispensed amounts 32a, 32b can be accurately measured. FIG. 3 schematically illustrates one type of result that could be achieved when uneven patterns of materials are sprayed: the lower sections 90 of adjacent channels 62 are filled with different levels of sprayed material 32. If such result were achieved, any or all of the various parameters of the nozzle array could be adjusted in order to achieve a more even distribution of sprayed material.

Figure 5:
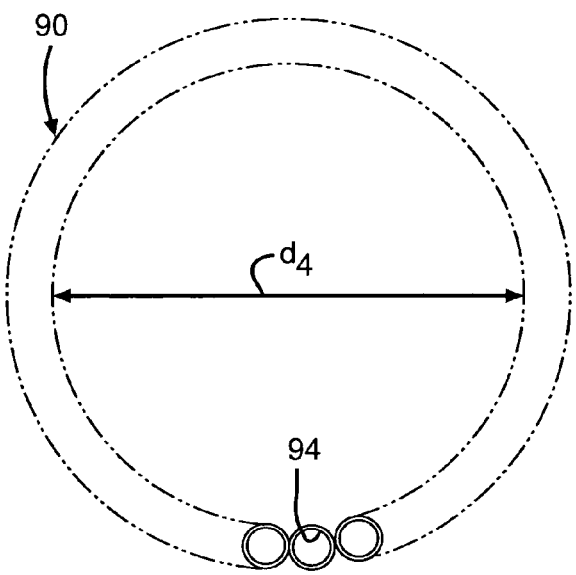
FIG. 5 is a cross-sectional view taken along the line 5-5 in FIG. 3.

In the embodiment shown in FIG. 3, the upper sections 70 of the channels 64 generally define a vertically extending plane and provide the upper section of the wall 62 with a generally annular shape having a first diameter, d3 (as shown in FIG. 4). The mid sections 80 provide the center of the wall 62 with a generally frustoconical shape which extends radially outwardly from the top of the wall 62. The lower sections 90 provide the bottom of the wall with a generally annular shape having a second, greater diameter, d4 (as shown in FIG. 5).

In certain embodiments, the nozzles 30 in the array 40 are spaced apart from adjacent nozzles so that the spaced apart nozzles generally evenly dispense the material onto the capture apparatus 60. In other embodiments, the nozzles 30 in the array 40 can be spaced apart at any desired position.

Figure 6A:
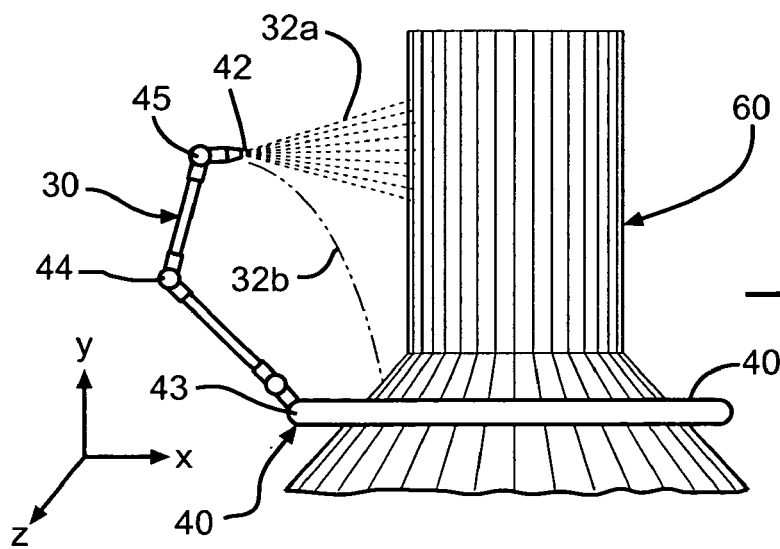
FIGS. 6A, 6B and 6C are schematic partial, elevational illustrations showing the adjustability of a pivotable nozzle in relation to differently sized capturing apparatuses.
Figure 6B:
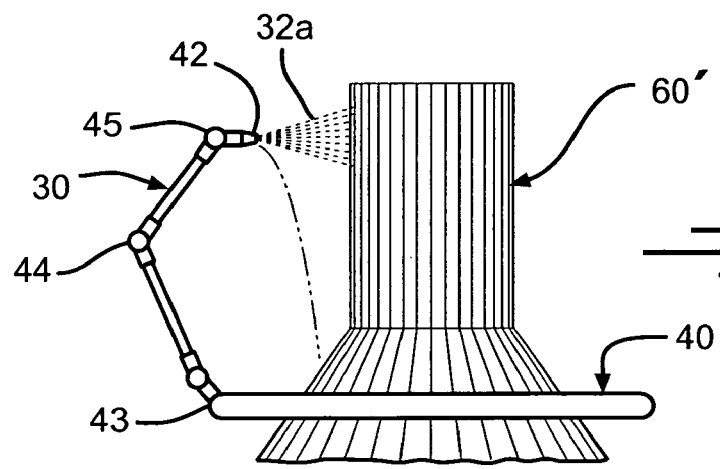
Figure 6C:
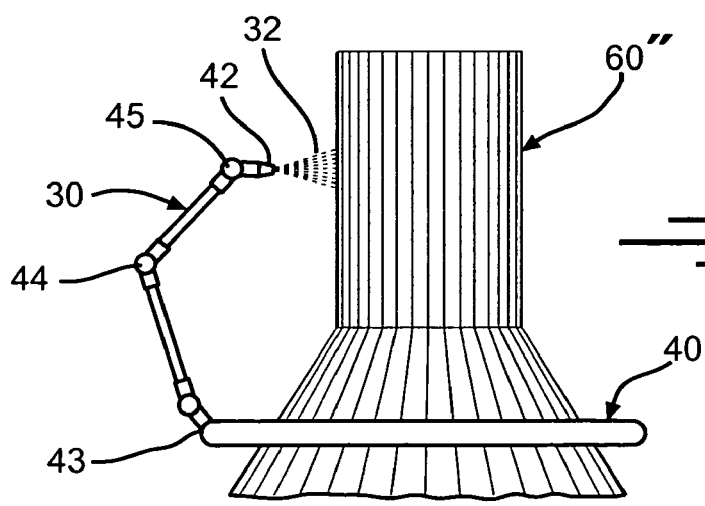

In the embodiment shown in FIGS. 6A-6C, the nozzle 30 is configured to be adjusted in one or more of the X, Y or Z axis. The nozzle 30 has at least one dispensing tip 42 which is configured to be adjustable in one or more of positions, angles or distances from the capture apparatus 60.

Also, in certain embodiments, the nozzle 30 includes one or more pivot members, shown therein as 43, 44 and 45, where a first pivot member 43 is connected to a second pivot member 44. The second pivot member 44 is connected to the third pivot member 45. The first, second and third pivot members 43, 44, 45 are configured to allow the nozzle 30 to be independently adjusted with respect to the other nozzles and with respect to the capture apparatus 60.

FIGS. 6A, 6B and 6C illustrate the versatility of the calibrating system 50 where one sized nozzle array 40 can be used to measure a different diameter sized capturing apparatuses, schematically illustrated as 60 in FIG. 6A, 60' in FIG. 6B, and 60'' in FIG. 6C. For example, one or more of the pivot members 43, 44 and/or 45 are adjusted in order to vary the distance between the nozzles 30 and the capture apparatus 60, the angle of spray onto the capture apparatus, or any other desired parameter as described herein.

In certain embodiments, the nozzle array 40 can include the nozzles 30 mounted in a circumferential relationship with respect to the capture apparatus 60. In such embodiments, the array 40 comprises a plurality of nozzles 30 mounted on a planar ring 46 which is coaxially aligned with the capture apparatus 60, as shown in FIGS. 2 and 3.

In another embodiment, as shown in FIG. 7, the nozzle array 40' can be a partial, (for example, one third or one fourth) ring 47. In such embodiment, the nozzle array partial ring 47 is configured to be moved, or adjusted, as a unitary member, in one or more of the X, Y and Z directions. That is, more than one nozzle 30 is configured to be moved as a unitary member with respect to the capture apparatus 50.

In another aspect, the present invention relates to a method of calibrating multiple spray patterns of a material being dispensed from multiple nozzles. The method includes: i) spraying the material onto a capture apparatus; ii) collecting the dispensed spray material in the capture apparatus; and iii) measuring the collected spray material. The method is especially useful for determining an optimum and/or balanced pattern of material dispensed onto forming fibers. Moisture control on the fibers is optimized, thereby reducing the drying time, the amount of material used, and/or the energy required to cure the sprayed material. The application efficiency is thus maximized when an overall spray pattern is balanced. The calibrating system takes into account the sprayed material both from a center of the sprayed material from each spray nozzle and from any overlapping sprayed material from the neighbor, or adjacent, spray nozzles.

While the invention has been described with reference to a preferred embodiment, it should be understood by those skilled in the art that various changes may be made and equivalents may be substituted for elements thereof without departing from the essential scope of the invention. In addition, many modifications may be made to adapt a particular situation or panel to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A calibrating system for measuring amounts of sprayed material comprising:
    an array of nozzles configured for dispensing the sprayed material;
    a capture apparatus configured to be positioned to receive the dispensed sprayed material from the array of nozzles, the capture apparatus having aligned channels configured for receiving the dispensed sprayed material along a curved wall, wherein the channels have an upper section configured to temporarily receive at least a first amount of the dispensed sprayed material, a mid section mounted below the upper section, the mid section configured to temporarily receive the first amount of dispensed sprayed material flowing from the upper section and further configured to temporarily receive a second amount of the dispensed sprayed material and, a lower section mounted below the mid section and configured to collect for measurement the dispensed sprayed material from the mid section.

2. The calibrating system of claim 1, wherein the midsection is configured to extend at an acute angle with respect to a vertical plane defined by the upper section.

3. The calibrating system of claim 1, wherein the upper section and lower section are annular walls, and the mid sections is a frustoconical wall.

4. The calibrating system of claim 1, wherein the channels extend from a top to a bottom of the capture apparatus.

5. The calibrating system of claim 1, wherein the channels in the lower section are closed.

6. The calibrating system of claim 1, wherein one or more of the nozzles are configured to move in an independent direction.

7. The calibrating system of claim 1, wherein one or more of the nozzles has one or more pivot members configured to allow the nozzle to be independently adjusted with respect to at least one of the other nozzles, or to the capture apparatus.

8. The calibrating system of claim 7, wherein the array of nozzles is mounted in a circumferential relationship with respect to the capture apparatus.

9. A method of calibrating multiple spray patterns of a material being sprayed from multiple nozzles, the method comprising:

spraying the material from an array of nozzles onto a capture apparatus collecting the sprayed material in the capture apparatus, and the capture apparatus has aligned collection channels for receiving the sprayed material, wherein the channels have an upper section configured to temporarily receive at least a first amount of the dispensed sprayed material, a mid section mounted below the upper section, the mid section configured to temporarily receive the first amount of dispensed sprayed material flowing from the upper section and further configured to temporarily receive a second amount of the dispensed sprayed material; and, a lower section mounted below the mid section and configured to collect for measurement the dispensed sprayed material from the mid section;

and measuring the collected sprayed material.

10. The method of claim 9, wherein the channels are aligned along a curved wall.

11. The method of claim 9, wherein the midsection is configured to extend at an acute angle with respect to a vertical plane defined by the upper section.

12. The method of claim 9, wherein the upper section and lower section are annular walls, and the mid sections is a frustoconical wall.

13. The method of claim 9, wherein the channels extend from a top to a bottom of the capture apparatus.

14. The method of claim 9, further including adjusting one or more of the nozzles relative to the capture apparatus.

15. The method of claim 9, further including adjusting at least one or more of: the number of nozzles, the incidence angle of nozzles, the spacing of adjacent nozzles around the capture apparatus, and the distance of the nozzles from the capture apparatus, depending on the amount of the dispensed sprayed material collected in the capture apparatus.

* * * * *